(12) United States Patent
Ahmed et al.

(10) Patent No.: US 7,158,484 B1
(45) Date of Patent: Jan. 2, 2007

(54) METHODS AND APPARATUS FOR TOPOLOGY SENSING IN NETWORKS WITH MOBILE NODES

(75) Inventors: Walid Ahmed, Eatontown, NJ (US); Hong Jiang, Westfield, NJ (US); Muralidharan Sampath Kodialam, Marlboro, NJ (US); Pantelis Monogioudis, Edison, NJ (US); Kiran M. Rege, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/513,325

(22) Filed: Feb. 25, 2000

(51) Int. Cl.
*H04L 12/26* (2006.01)
*H04L 3/40* (2006.01)
*H04Q 7/00* (2006.01)
*H04J 3/06* (2006.01)
*H04J 3/16* (2006.01)

(52) U.S. Cl. .................. 370/254; 370/332; 370/335; 370/350; 370/439; 370/468; 455/450

(58) Field of Classification Search ........ 370/254–256, 370/328–329, 335, 337, 342, 347, 524, 331, 370/332, 350, 439, 468, 320, 322; 455/422.1, 455/435.1, 456.1, 456.2, 456.5, 456.6, 513, 455/436–438, 450–454
See application file for complete search history.

(56) References Cited

U.S. PATENT DOCUMENTS

| | | | | |
|---|---|---|---|---|
| 5,737,319 A | * | 4/1998 | Croslin et al. ............... | 370/255 |
| 5,844,900 A | * | 12/1998 | Hong et al. ................. | 370/342 |
| 5,844,905 A | * | 12/1998 | McKay et al. ............... | 370/443 |
| 5,926,470 A | * | 7/1999 | Tiedemann, Jr. ............ | 370/334 |
| 6,052,594 A | * | 4/2000 | Chuang et al. ............. | 455/450 |
| 6,363,062 B1 | * | 3/2002 | Aaronson et al. .......... | 370/348 |
| 6,456,599 B1 | * | 9/2002 | Elliott ........................ | 370/254 |
| 6,463,096 B1 | * | 10/2002 | Raleigh et al. ............. | 375/225 |
| 6,516,345 B1 | * | 2/2003 | Kracht ....................... | 709/220 |
| 6,545,984 B1 | * | 4/2003 | Simmons | |
| 6,563,809 B1 | * | 5/2003 | Proctor, Jr. et al. | |
| 6,711,409 B1 | * | 3/2004 | Zavgren et al. ............. | 455/445 |
| 6,788,702 B1 | * | 9/2004 | Garcia-Luna-Aceves et al. | 370/458 |

OTHER PUBLICATIONS

J. Jubin et al., "The DARPA Packet Radio Network Protocols," Proceedings of IEEE, vol. 75, No. 1, Jan. 1987.

* cited by examiner

*Primary Examiner*—Wellington Chin
*Assistant Examiner*—Melanie Jagannathan

(57) ABSTRACT

A novel topology sensing methodology is provided for point-to-point link setup among a set of network nodes, which are mobile. The technique provided is TDMA contention-based, where each network node sends pilot signals to announce its existence. Pilot signals transmitted by network nodes are used by surrounding nodes to extract various pieces of information such as node identity, node location and potential link quality. Information collected from pilot signals of neighboring nodes is used in conjunction with other topological criteria to identify the best set of nodes with which a given node should establish links. The topology sensing methodology avoids duplexer problems and attempts to achieve minimum collision by allowing the nodes to continually monitor available pilots and transmit on the least-interference channels. The topology sensing methodology can also optionally make use of GPS information, when available, in order to provide an accurate map for communicating nodes and improve the link setup process.

35 Claims, 7 Drawing Sheets

|  | $P_1$ | $P_2$ | ... | $P_P$ |
|---|---|---|---|---|
| $S_1$ | $RSSI_{(1,1)}$ | $RSSI_{(1,2)}$ | ... | $RSSI_{(1,P)}$ |
| $S_2$ | $RSSI_{(2,1)}$ | $RSSI_{(2,2)}$ | ... | $RSSI_{(2,P)}$ |
| ⋮ | ⋮ | ⋮ | ⋮ | ⋱ | ⋮ |
| $S_N$ | $RSSI_{(N,1)}$ | $RSSI_{(N,2)}$ | ... | $RSSI_{(N,P)}$ |

RSSI = RECEIVED SIGNAL STRENGTH INDICATOR

| PREAMBLE | NODE ID | NODE LOCATION | NUMBER OF POSSIBLE ADDITIONAL LINKS | EXISITING LINKS | LIST OF NODES HEARD WITH GOOD QUALITY | ACCESS CHANNEL | ERROR DETECTION CODING |
|---|---|---|---|---|---|---|---|

FIG. 11

| # OF LINKED NODES ($n_i^L$) THAT CAN'T HEAR $n_0$ | # OF NON-LINKED NODES ($n_j^{NL}$) THAT CAN'T HEAR $n_0$ | $PLC_{i,0}^L$ (FOR ALL LINKED NODES) | $PLC_{j,0}^{NL}$ (FOR ALL NON-LINKED NODES) |
|---|---|---|---|
| $\geq l_1$ | $\geq 0$ | $\geq 0$ | $\geq 0$ |
| $\geq 0$ | $\geq l_2$ | $\geq 0$ | $\geq 0$ |
| $\geq l_3$ | $\geq l_4$ | $\geq 0$ | $\geq 0$ |
| $\geq l_5$ | $\geq 0$ | $\geq c_L$ | $\geq 0$ |
| $\geq 0$ | $\geq l_6$ | $\geq 0$ | $\geq c_{NL}$ |
| $\geq l_7$ | $\geq l_8$ | $\geq c_L$ | $\geq c_{NL}$ |

METHODS AND APPARATUS FOR TOPOLOGY SENSING IN NETWORKS WITH MOBILE NODES

FIELD OF THE INVENTION

The invention relates generally to communications networks and, more particularly, to methods and apparatus for topology sensing in wireless communications networks with mobile nodes.

BACKGROUND OF THE INVENTION

Topology sensing is crucial for proper link setup as well as routing in a wireless communications network. The problem becomes more difficult to solve when communicating nodes are mobile, as in such cases, link conditions as well as node locations are continuously varying with time. Hence, a robust algorithm is needed in order to establish good links among communicating nodes and at the same time maintain a relatively stable topology. Otherwise, links will be established/torn-down very rapidly and routing, which is fundamentally based on topology configuration, becomes very difficult to handle and routing convergence becomes a serious problem, if not infeasible.

Consider a wireless network with a highly dynamic topology with mobile network nodes and mobile subscribers. The nodes are connected to one or more of their neighbors via point to point wireless links, thus providing backbone connectivity that extends over the service area of the network. The network nodes also provide wireless access to the mobile subscribers which can setup multimedia calls with other subscribers within the network or outside of the network. By way of one example, such a network is described in U.S. patent applications identified by Ser. No. 09/191,133 (entitled: "Subnetwork Layer for a Multimedia Mobile Network"); Ser. No. 09/191,132 (entitled: "Addressing Scheme for a Multimedia Mobile Network"); and Ser. No. 09/191,134 (entitled: "Mobility Management for a Multimedia Mobile Network"), all concurrently filed on Nov. 13, 1998, the disclosures of which are incorporated by reference herein. Given the mobility of both the subscriber terminals and the network nodes, implementation of a topology sensing methodology for use in such a network raises one or more of the issues mentioned above.

There are various topology sensing methodologies known in the communications prior art. For example, typical cellular/PCS networks implement a form of topology sensing wherein network nodes, i.e., base stations, transmit pilot signals to subscriber terminals. However, in a cellular/PCS network, only subscriber terminals are mobile while network nodes or base stations are static. Thus, any topology sensing is concerned only with the mobility of the subscribers and thus no provision is made for the mobility of a base station.

The DARPA Packet Radio Network (PRNET) is a kind of a mobile ad-hoc radio network in which network nodes are mobile and use the wireless radio medium to communicate with one another. The network nodes use a hop-by-hop packet forwarding mechanism to carry traffic from the source node to the destination if the source and destination cannot "hear" each other. The network topology is constantly changing so that the network nodes need to keep track of this dynamically changing topology in order to be able to direct traffic to the correct destinations. A PRNET employs the following mechanism to keep track of the changing topology and to provide end-to-end connectivity in the network. Nodes in a PRNET have a common channel that is used by all nodes to carry user traffic as well as to announce their presence through the transmission of some special packets. Each node periodically transmits these special packets on that channel which is typically supported by an omni-directional antenna. The protocol for transmitting these special packets as well as user packets is "carrier sense multiple access" in which nodes attempt to transmit packets only after sensing that the carrier (channel) is idle. Even then, there is a random wait period which is intended to reduce the probability of multiple nodes transmitting their packets simultaneously after the channel becomes idle. PRNET is further described in J. Jubin et al., "The DARPA Packet Radio Network Protocols," Proceedings of IEEE, vol. 75, no. 1, January 1987, the disclosure of which is incorporated herein by reference.

While the scheme employed in PRNET, to enable network nodes to announce their presence and sense the presence of their neighbors, does its job, it is not particularly efficient or well suited to highly mobile networks where nodes are interconnected with high speed point-to-point links supported by steerable directional antennas. Also, the PRNET makes no provision for changing channels specifically to avoid collision of the special packets associated with its topology sensing mechanism.

Therefore, there is a need for methods and apparatus for topology sensing in a communications network including mobile network nodes which eliminate or at least reduce the effects associated with the shortcomings of the prior art as discussed above and which otherwise exist in the art.

SUMMARY OF THE INVENTION

The present invention addresses the above mentioned issues by providing methodologies which allow mobile network nodes to sense the presence of one another on a dedicated channel. Moreover, the present invention allows these nodes to collect additional information about their neighbors such as, for example, potential link quality (e.g., if a point to point link were to be set up with them) which can be highly useful in making link setup decisions whose objective is to achieve good overall network connectivity and power and frequency reuse efficiency.

It is to be appreciated that the phrase "network node" as used herein is intended to refer to a mobile device which allows mobile users (mobile user stations, terminals, etc.) to access the communications network and also may provide routing functions for traffic traversing the network. Network nodes are preferably connected by point-to-point wireless links to provide network-wide connectivity. In other words, a network node is an access node that acts like a base station, however, it is capable of being mobile, as mentioned earlier. A network node collects traffic from mobile users connected thereto and trunks such traffic to the rest of the network through point-to-point links with neighbor nodes of a similar nature. A network node also delivers traffic received through the point-to-point links to appropriate recipients among the mobile users connected thereto. As will be seen in an exemplary embodiment, mobile users may be connected to a mobile network node via some "multiple access" medium such as Code Division Multiple Access (CDMA), Time Division Multiple Access (TDMA), or others, while network nodes are preferably connected to each other via point-to-point wireless links. The present invention is concerned specifically with topology sensing as needed for the point-to-point links among network nodes, or similar scenarios.

In a first aspect of the present invention, methods and apparatus are provided for constructing pilot signals that are transmitted by all mobile network nodes on channels independent of the user traffic channels, i.e., dedicated channels. The pilot signal transmitted by a network node is received and processed by other network nodes to sense the presence of the former in their neighborhood.

In a second aspect of the present invention, methods and apparatus are provided for dynamic switching of (i.e., dynamically changing) channels, used to transmit pilot signals, by network nodes to reduce the probability of collision as well as to reduce the probability of multiple nodes in the neighborhood of one another using the same pilot channel which would prevent them from hearing each other.

In a third aspect of the present invention, methods and apparatus are provided for inclusion of additional information about a network node in the pilot signal transmitted by that node which is useful for link setup decision.

In a fourth aspect of the present invention, methods and apparatus are provided for processing pilot strength and quality measurements as well as the additional information included in the pilot signal to facilitate link establishment decisions.

In existing cellular and PCS networks, as well as planned cellular and PCS networks, network nodes (i.e., base stations) transmit pilot signals which are received and processed by mobile terminals for use in making handoff/call origination decisions. However, in these networks, the nodes transmitting the pilot signals are stationary which allows system designers to allocate pilot signals to different nodes to achieve minimal interference or collisions. Also, once these signals are carefully allocated, there is no need to change them since the network topology, in this case, is static. Another feature of the operation of typical cellular or PCS networks which is of considerable importance to the design of pilot signals is the fact that in these networks the nodes which transmit the pilot signals (i.e., base stations) and the terminals which receive and process these signals (i.e., mobile subscribers) are distinct. This means that in these networks there is no possibility of a duplexer problem, i.e., a given node transmitting its pilot signal on a specific channel and listening for pilot signals (transmitted by other nodes) on the same channel at the same time. In the networks for which the present invention is particularly suitable, all of the network nodes transmit pilot signals (i.e., to announce their presence), while receiving and processing pilot signals from other network nodes to determine their suitability for setting up point-to-point links. These requirements present a stiffer challenge for the design of pilot signals when compared to the requirements of cellular and PCS networks. The following is an illustrative summary of how the dynamic pilot signal structure embodied in the present invention addresses these requirements according to a particular illustrative embodiment.

The invention defines a pilot signal structure that is based on a combination of Time Division Multiple Access (TDMA) and either Frequency or Code Division Multiple Access (FDMA or CDMA) techniques. Accordingly, a common (universal) frame structure is defined with a frame (which is of a fixed, predetermined duration) divided into a fixed number of slots. If a TDMA-FDMA combination is being used, then a set of frequencies (or "tones") are also defined for pilot signal transmission. In the case of a TDMA-CDMA combination, a set of spreading sequences rather than tones are defined for pilot signal transmission. Network nodes dynamically use combinations of time slots and tones, or spreading sequences in the case of TDMA-CDMA, to transmit their pilot signals. When they are not transmitting their pilot signals, they listen for pilot signals being transmitted by other network nodes by monitoring all of the time slot-tone, or time slot-spreading sequence, combinations that could, possibly, be used by other nodes. This methodology results in an avoidance of the duplexer problem. Also, the methodology allows the system to reduce the probability of interference and/or collision by different network nodes.

The pilot signal structure may include one or more segments of training sequences (e.g., which enable potential receivers to detect and decode the signals) and a number of fields which carry many useful pieces of information for the potential receivers.

The pilot signals may include various fields which provide various pieces of information to the potential users. These fields carry information such as, for example, the node identifier, location (e.g., GPS coordinates) of the node, existing links between the node and its neighbors, number of additional links that the node can support, a list of nodes that are heard by it with good quality, access channel details, etc. Some of these fields may be dropped to make for a more compact signal. On the other hand, one may also add some other fields to provide additional topological information. The information fields could be protected by a cyclic redundancy check (CRC). Error correcting coding may also be used.

A key feature of the invention which helps reduce the probability of pilot signals from different nodes interfering with each other is the dynamic switching (i.e., changing) of pilot channels by network nodes. Owing to the fact that network nodes are mobile, the choice of pilot channels which is optimum for a set of nodes at one time may no longer be so at a later time when the relative distances between the nodes have changed. This could result in nodes being unable to sense the presence of one another. To avoid this problem, the invention provides for network nodes to keep switching their pilot channels (i.e., use different "slot-tone" or "slot-sequence" combinations to transmit their pilot signals) at regular intervals. The intervals are randomized to avoid the likelihood of different nodes continuing to interfere with each other as they keep switching to identical slot-tone or slot-sequence combinations at the same time. An important aspect of the pilot switching technique is selection of the slot-tone or slot-sequence combination to switch to. Remember that all nodes are constantly monitoring the slot-tone or slot-sequence combinations they are not using to transmit their own pilot signals and also that each node includes in its pilot signals useful information such as the identities of nodes heard with good quality. Based on this, a node can decide which set of slot-tone or slot-sequence combinations is likely to suffer minimal interference. It selects one of these combinations according to a predetermined scheme which may be random or deterministic or a combination thereof and uses it to transmit its pilot signals when it is time to switch pilots at the end of the current (randomized) interval. An algorithm for maintaining topological information, which will be explained in detail below, helps make this decision.

As previously mentioned, each network node measures the received signal strength for all pilot channels (i.e., slot-tone or slot-sequence combinations) other than the one which it is using for the transmission of its own pilot signals. Also, the node attempts to decode the information transmitted by other nodes as part of their pilot signals. The node preferably processes and stores this information in a table which is used to make decisions regarding pilot channel selection (e.g., when the node has to switch to a new pilot channel). This table may also be used by network construction/link setup algorithms to decide with which, if any, of the neighboring nodes point-to-point links should be established. When the network construction/link setup algorithm of a network node decides to establish a point-to-point link with a neighboring node, the two nodes exchange messages leading to the establishment of the link. This message exchange is carried over a pair of access channels. It is assumed that each node has an access channel associated with it to which it is constantly listening. The information (e.g., the spreading code in case a CDMA channel is used) about the access channel associated with a node is, as mentioned previously, included in the pilot signal transmitted by that node. This allows other nodes interested in establishing links with that node to exchange messages with it. It is to be understood that the particular design of the access channel and the protocol to be used to exchange messages over access channels are beyond the scope of this invention.

It is to be appreciated that networks of the kind described above could arise in battlefield situations where mobile network nodes can be envisioned to provide wireless access to a large number of subscribers/troops on the move. Another instance of this kind of networks would be networks quickly deployed to support disaster relief operations. While the topology sensing methodologies of the invention may be employed in such networks, the invention is not limited to any particular such network or application.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 11 is an example of a condition table for pilot switch initiation according to an embodiment of the present invention.

DETAILED DESCRIPTION OF PREFERRED EMBODIMENTS

The present invention will be illustrated below in conjunction with an exemplary wireless communications system in which both end user terminals, i.e., mobile stations, and system access points, i.e., network nodes, may be mobile. It should be understood, however, that the topology sensing methodologies of the invention are not limited to use with this particular exemplary system, but are instead more generally applicable to any communications system wherein both user terminals and system access points may be mobile. Further, the term "processor" as used herein is intended to include any processing device, such as a CPU (central processing unit) and/or other processing circuitry, which may be utilized in a mobile station or network node. Also, the term "memory" as used herein is intended to include memory associated with a processor or CPU, such as RAM, ROM, a fixed memory device (e.g., hard drive), or a removable memory device (e.g., diskette). In addition, the processing unit may include one or more input devices, e.g., keypad or keyboard, for inputting data to the processing unit, as well as one or more output devices, e.g., CRT display, for providing results associated with the processing unit. Accordingly, software instructions or code for performing the methodologies of the invention, described herein, may be stored in one or more of the associated memory devices (e.g., ROM, fixed or removable memory) and, when ready to be utilized, loaded into RAM and executed by the CPU.

The remainder of the detailed description will be divided as follows: (I) Exemplary Network Component Arrangement; (II) Topology Sensing Introduction; (III) Pilot Selection and Transmission; (IV) Pilot Detection And Processing; and (V) Link Setup.

I. Exemplary Network Component Arrangement

Figure 1A:
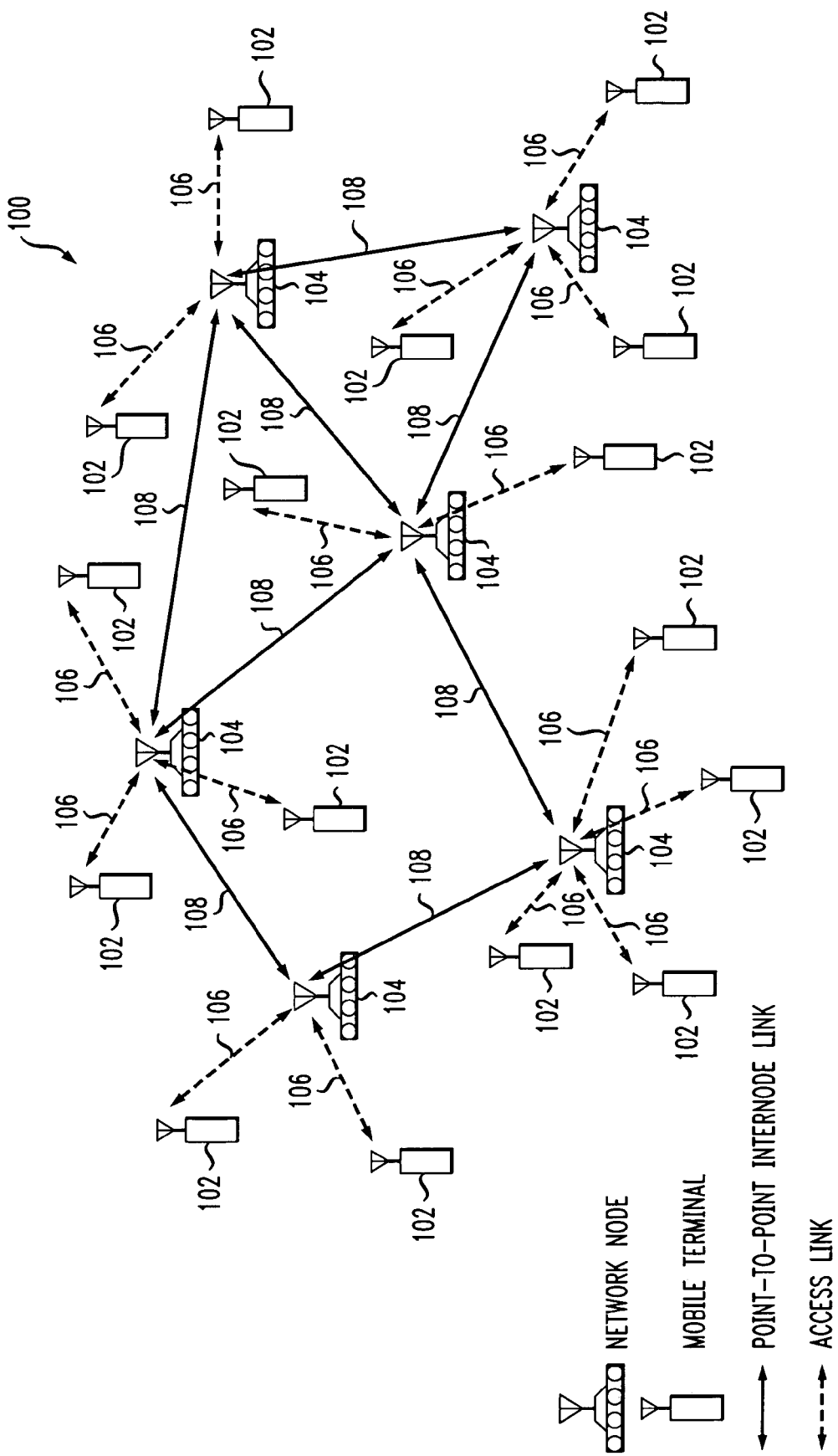
FIG. 1A is a block diagram illustrating a communications network suitable for employing the topology sensing methodologies of the present invention.

Referring initially to FIG. 1A, a block diagram is shown of an illustrative mobile communications system 100 suitable for use with the topology sensing methodologies of the present invention is shown. Particularly, mobile end users 102, hereinafter referred to as "mobile stations" (MSs), "mobile terminals," or, more simply, "mobiles", are operatively coupled to network nodes 104 via access links 106. Like the mobiles 102, the network nodes 104 preferably have the ability to move. The network nodes 104 are operatively coupled to each other via an internode or backbone network comprising point-to-point links 108. While FIG. 1 illustrates a particular number of mobiles and network nodes, it is to be appreciated that the system 100, employing topology sensing according to the invention, may include any number of mobile end systems 102 and network nodes 104.

The internode network of links 108 between the plurality of network nodes 104 are preferably point-to-point wireless links. It is to be appreciated that each network node 104 serves as both a base station to the mobiles 102 directly communicating therewith and as an intermediate router for packets passing therethrough. That is, each network node provides wireless access to the mobile terminals and also acts as a switch. Some of the network nodes are preferably connected via satellite or terrestrial links to external networks, e.g., fixed networks (not shown). These nodes have the additional functionality of a "gateway" which provides the interworking functions to maintain consistency with the protocols used in these external networks. Also, it is through the internode network of links 108 that the system connects with various service providers (not shown) capable of providing various multimedia-based services to the mobiles 102. Further, some of the network nodes may be airborne. Mobiles may move from the coverage area associated with one network node to the coverage area of another network node. Because the network nodes, like the mobile stations, are mobile, the system 100 is characterized by a constantly changing topology.

As mentioned, network nodes in system 100 are preferably inter-connected with point-to-point wireless links. As will be explained in detail below, the network nodes are equipped with topology sensing methodologies according to the present invention which enables them to sense the presence of other nodes as they move closer. The nodes use certain rules to select which of their neighboring nodes they should have links with. The idea is to enable nodes to establish links with their nearest (e.g., best, or more visible) neighbors (e.g., in terms of path loss) subject to certain connectivity requirements.

The system 100 preferably provides connectionless switching between its end-points. That is, even for connection-oriented services (e.g., any TCP/IP applications, voice call applications, video sessions, etc.), there are no virtual circuits between the network nodes providing access to the mobile terminals involved in that call. The use of connectionless switching within the system 100 is preferred for at least the following reason: given the highly dynamic nature of the network topology, inter-node links are set up and torn down rather frequently and, as such, in the case of virtual circuit switching, this would necessitate the reestablishment/redirecting of a large number of virtual circuits (over new paths). However, with connectionless switching, changes in topology result only in changes in routing tables which can be handled much more efficiently than redirecting virtual circuits.

Figure 1B:
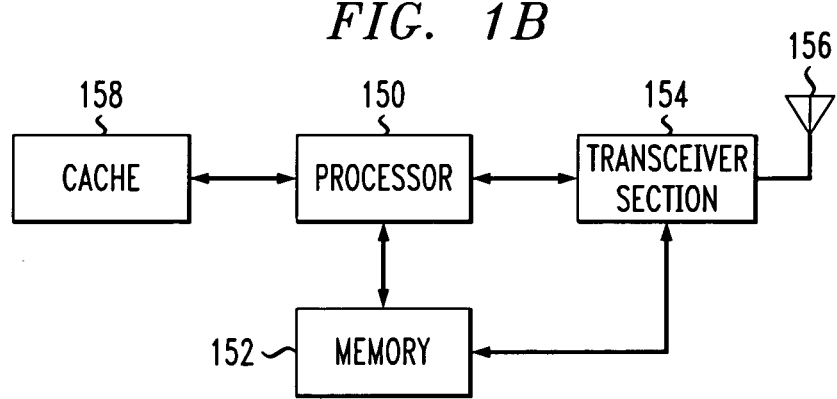
FIG. 1B is a block diagram of a hardware implementation of a portion of a network node according to an embodiment of the present invention.

Referring to FIG. 1B, a block diagram is shown of an exemplary hardware configuration of a portion of a network node 104 for implementing topology sensing according to the invention. Specifically, a processor 150 for controlling the operations, described herein, of either the mobile station or the network node is operatively coupled to a memory 152, a transceiver section 154, and a cache 158. An antenna 156 is operatively coupled to the transceiver 154. The processor 150 executes the methodologies associated with the topology sensing techniques described herein in cooperation with memory 152. A separate cache 158 may preferably be provided for handling certain functions associated with the invention. The transceiver 154 and antenna 156, as is known, provide wireless connection to other elements of the system, e.g., between a mobile station 102 and a network node 104. The transceiver 154 comprises a modem, which is configured to transmit and receive signals in a manner compatible with the air links employed. It is to be appreciated that the transceiver section 154 may include more than one transmitter and receiver such that the node may communicate with more than one other network node at a time over different channels.

II. Topology Sensing Introduction

It is to be appreciated that a principal objective of a topology sensing methodology in a system with mobile user terminals and mobile network nodes is to enable nodes in a dynamic network to sense the presence and, preferably, the location and potential signal quality of their neighboring nodes. This enables the nodes to make intelligent decisions regarding point-to-point link selection/setup among network nodes.

Generally, such a topology sensing mechanism should satisfy at least three fundamental constraints:

(i) The technique avoids duplexer problems. That is, channels used for transmitting node identification are completely orthogonal to those used for receiving, i.e., sensing, information about neighboring nodes.

(ii) The technique attempts to minimize collision probability among node identification signals so that each node is able to reliably resolve neighboring node identities without confusion, as far as possible.

(iii) The technique, to the extent possible, is able to determine all necessary information needed in order to help network construction/link-setup algorithms to construct robust network topologies which can provide good coverage to the desired set of nodes.

In fact, such a topology configuration mechanism should be able to handle at least four main tasks: (i) pilot selection and transmission; (ii) pilot sensing (detection) and processing; (iii) link selection and establishment (e.g., topology management layer); and (iv) link termination (e.g., topology management layer).

Figure 2:
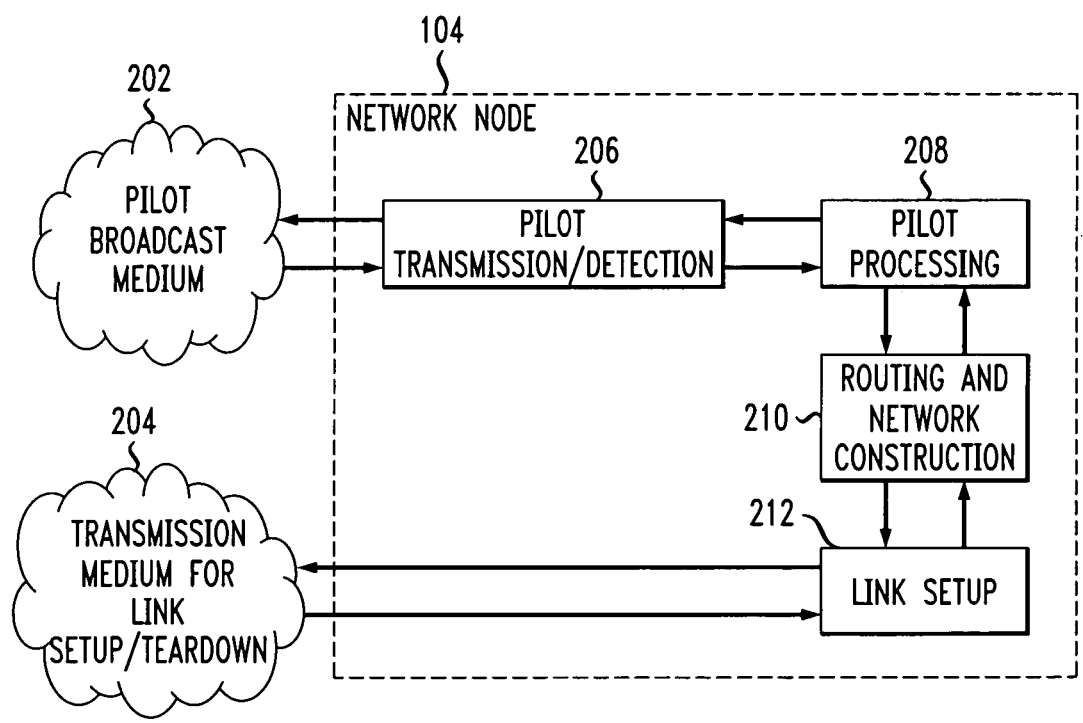
FIG. 2 is a block diagram illustrating interaction of protocols within a network node.

Referring to FIG. 2, an illustration of the interaction of different tasks/functions involved in topology sensing, i.e., pilot sensing and transmission, in a network node 104 is shown. The interaction of link setup is also shown. The pilot broadcast medium 202 is the medium through which pilot signals are transmitted. This medium includes a channel that makes up part of the point-to-point air link 108 (FIG. 1A). The transmission medium for link setup/tear down 204 is the medium through which network nodes exchange messages regarding links to be setup/torn down amongst them. Again, this is part of the point-to-point air link 108, but it comprises a separate channel that is orthogonal (without interference) with the pilot channel associated with the pilot broadcast medium. Thus, the pilot channel is independent of other transmission channels associated with the network node, e.g., the transmission medium for setup/tear down 204 and the user traffic channel (not shown). That is, the pilot channel is a separate and dedicated channel.

The pilot transmission/detection module 206 is coupled to the pilot broadcast medium 202 ans is responsible for the transmission of the pilot signal (by the network node) and for receiving (detecting or decoding) pilot signals transmitted by other neighbor nodes. The pilot processing module 208 is coupled to the pilot transmission/detection module 206 and is responsible for collecting the data (regarding received pilots as well as links and nodes in the vicinity) contained in the received pilot signals, analyzing such data and communicating with the routing & network construction module 210 in order to make a decision regarding pilot channel switching, what to announce in the pilot signal and update the database of the node, e.g., the Node & Link Information (N&LI) table as will be explained below in the context of FIG. 9.

The routing & network construction module 210 is coupled to the pilot processing module 208 and is responsible for setting up/tearing down internode links and for further routing of traffic through such links. The link setup module 221 is coupled between the routing & network construction module 210 and the transmission medium for link setup/tear down 204 and is responsible for deciding whether a link with some node(s) is good enough to be set up or bad enough to be torn down. Module 212 is also responsible for deciding which links need to be set up with what nodes according to module 210. Moreover, module 212 determines what physical channels should be used to implement a link.

It is to be appreciated that the processor, memory, cache, transceiver section and antenna elements shown in FIG. 1B may be used to implement some or all of the elements shown in the network node of FIG. 2.

In general, to enable mobile network nodes to sense the presence of their neighbors and establish point-to-point links with them, four types of channels should be made available. The first type is the set of pilot channels available for the system. Pilot channels are omni-directional broadcast channels, which are used, by the network nodes, to announce their existence. The second type is the set of broadcast channels that are needed in order for the nodes to announce various link and node parameters required for the link setup mechanism. It is to be appreciated that, in a preferred embodiment, the first and second channel type correspond to the pilot broadcast medium 202 (FIG. 2). The third type is the set of "access" channels that are required in order for the nodes to exchange messages among themselves and negotiate/request link establishment, or termination. Each node should announce its access channel to other nodes. Hence, nodes that are interested in exchanging link setup messages with a certain node should contend for the access channel of that node. Thus, access channels are, in fact, contention-based. This third type of channel is part of the transmission medium 204 (FIG. 2), but the identifier of the access channel is preferably part of the pilot signal information. The last type of channels that is required for the link setup procedure is the set of the actual links that will carry the traffic routed from one node to the other (not shown). These "link" channels are of a point-to-point nature and maybe kept as a pool from which nodes pick channels in a dynamic fashion.

As an option, since pilot channels as well as the broadcast channels required for the announcement of link and node conditions are both omni-directional broadcast channels, the invention provides for combining them into one type of channel. Thus, the pilot signal may carry topology sensing related information, as a well as various link and node parameters required for the link setup mechanism. This will be illustrated in the context of FIG. 6.

In the following sections, a mechanism is provided to implement the first two tasks of the topology configuration, namely, pilot selection and transmission, and pilot sensing. The remaining tasks, namely, link selection and establishment, and link termination, greatly depend on the higher-level network construction algorithms used for the network. Since this problem is beyond the scope of the invention, we only outline how these tasks may be implemented.

III. Pilot Selection And Transmission

Figure 3:
FIG. 3 is a diagram illustrating a pilot signal format according to an embodiment of the present invention.

There are two main techniques to transmit pilot signals. The first is to transmit pilot signals using different tones, i.e., frequencies, and the second is to transmit pilot signals using different PN-codes (pseudo-random noise codes), i.e., signatures. For both techniques, a pilot signal preferably has a format as shown in FIG. 3. The pilot signal comprises a "training period/preamble" portion and a "node and link information" portion.

Notice that the term "pilot" refers a tone (when FDMA is used) or a PN-code (when CDMA is used), whereas the term "pilot signal" refers to the complete pilot signal that is carried over some pilot channel. It is assumed that there are P pilots available to the system. As will be seen, identification of a pilot channel comprises a (pilot, slot) pair.

(a) General Concept

Figures 4, 5, 6:
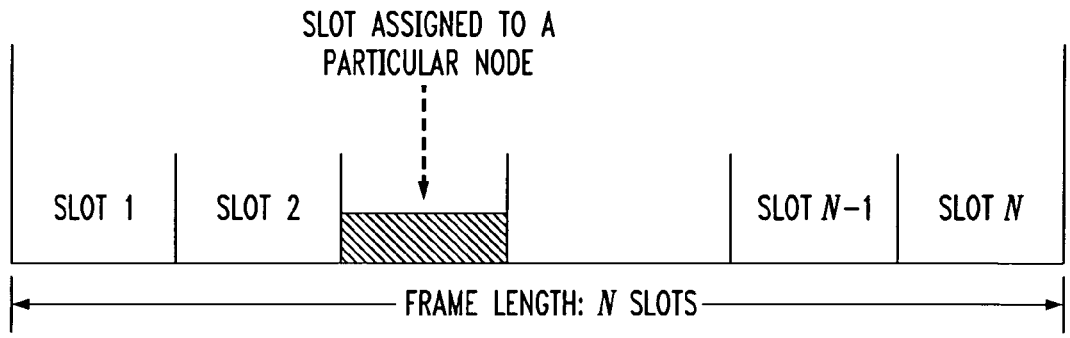
FIG. 4 is a diagram illustrating a frame structure for pilot signal transmission according to an embodiment of the present invention.
FIG. 5 is an example of an RSSI measurement table according to an embodiment of the present invention.
FIG. 6 is a diagram illustrating exemplary pilot signal contents according to an embodiment of the present invention.

The pilot multiple-access technique provided in accordance with one embodiment of the invention is TDMA-based. That is, each node transmits its pilot signal in a designated time slot. Every N time slots constitute a "frame." FIG. 4 illustrates a frame structure for pilot signal transmission according to an embodiment of the present invention.

When a node is transmitting, its receiver is turned off in order to avoid duplexer problems. On the other hand, when a node is not transmitting, it listens to transmissions taking place in other time slots. In fact, if different pilot channels are characterized by different tones, i.e., frequency bands, a node receiver may listen to the pilot signals using pilot tones other than that node's pilot tone, even while the node is transmitting its pilot signal in its designated slot. With PN-code based transmissions, however, the receiver will have to be completely shut-off during the slot in which the node is transmitting its pilot signal. Nodes are assumed to be able to synchronize to each other's signals through some suitable technique, e.g., a distributed technique such as a correlation based synchronization process or a centralized technique such as use of a global clock (e.g., a Global Positioning System or GPS clock).

(b) Selecting a Pilot

Let us consider a network node that has just turned on and is in the process of selecting a pilot. In order for such a node to start the transmission of a pilot signal, it scans, i.e., listens to, all pilots in all time slots in a frame period. Such a process may, clearly, be repeated for a few frame periods in order to obtain more reliable estimates of received signal strengths through averaging or filtering. The starting node then forms a table such as, for example, is shown in FIG. 5.

The table in FIG. 5 is, basically, a list of the Received Signal Strengths, which the starting node has experienced, for all pilots ($P_1 \ldots P_P$) and all time slots ($S_1 \ldots S_N$). Clearly, the starting node would pick the combination of time slot and pilot which corresponds to the "minimum RSSI" of all entries in the table. That is, the node selects the combination of pilot channel and time slot which yields the least interference, or noise.

Notice that a starting node must select a (pilot, slot) pair, which corresponds to the best pairing it has been able to find, even if it finds that some interference still exists on that "least-interference" pair. A starting node may detect a significant amount of interference on the selected (pilot, slot) pair. However, we preferably do not impose a limit on the maximum allowable interference on a selected pilot channel, since some infeasible conditions may be encountered. Instead, we let the nodes start up with a "best guess" pair selection. If such a guess turns out to be a bad one, nodes try to remedy that by switching to different pilots according to an algorithm, as will be explained below.

(c) Pilot Signal Contents

Referring to FIG. 6, a diagram is shown illustrating exemplary pilot signal contents according to an embodiment of the present invention. In general, the fields shown in FIG. 6, as occurring in a pilot signal, comprise a list of items that are useful from the viewpoint of topology sensing and network construction. As mentioned above in the context of FIG. 2, it is to be appreciated that these fields may include topology sensing related information (e.g., preamble, node ID, list of nodes heard with good quality), as a well as various link and node parameters required for the link setup mechanism (e.g., node location, number of possible additional links, existing links and access channel ID). In case the resulting bit rate requirement is felt to be excessive, some fields may be dropped to make for a more compact pilot signal.

The following is a description of each content section of the pilot signal depicted in FIG. 6:

(i) Preamble: The preamble section contains a training sequence that is used to acquire synchronization and channel state information. This is required in order to be able to demodulate and decode the information included in the rest of the pilot signal. Generally, if the slot duration is long relative to the channel state rate-of-change, the preamble can be split into several portions scattered over the pilot slot (mid-ambles) in order to obtain better channel estimates.

(ii) Node ID: Node ID is the node identification.

(iii) Node Location: Node location is the location parameters of the node (for example, a Global Positioning System (GPS) location of the node).

(iv) Number of Possible Additional Links: Normally, a node $n_i$, will be able to maintain up to $L_i$ number of links with neighboring nodes, according to demand. A "link" is a point-to-point connection between two nodes. Each two nodes can only have one link between them. However, a link can have an arbitrarily large bandwidth, according to system limitations. If the number of existing, or established, links is smaller than what the node can potentially support, the node announces the number of additionally required links to be established, in order to inform neighboring nodes in case the routing algorithm determines that one of the neighboring nodes needs such a link to be setup so that the neighboring node may trunk its traffic through it.

(v) Existing Links: In this field, the node broadcasts a list of the ID's of the nodes it has established links with. The node also broadcasts a "Pilot Quality Indicator" (PQI) for each link. A PQI is a set of grades that are used to rank the nodes according to some metrics. PQI will be discussed in detail later. Finally, the node may, optionally, broadcast the (pilot, slot) pair used during the last frame by each of the nodes it is linked with as well as the location of the corresponding node.

(vi) List of Nodes Heard with Good Quality: In this field, the node broadcasts the ID's of those nodes which it can hear with good quality. In addition, optionally, the node may broadcast the pilot quality indicators (PQI's) along with their corresponding ID's. The node may also, optionally, broadcast the (pilot, slot) pair used during the last frame by each of the nodes it is hearing with good quality as well as the location of the corresponding node. One reason for doing so is to be able to assign priorities to (pilot, slot) pairs that may act as potential choices to switch to in case a node needs to change its (pilot, slot) pair. For example, pairs that are used by anyone in the vicinity (referred to as "first tier nodes") are most important to avoid collision with. Then, less important are pairs which are used by nodes that the subject node can not hear, but some neighboring nodes can (referred to as "second tier nodes"). Preferably, a node is only allowed to broadcast the "Best K" nodes it can hear.

(vii) Access Channel: The access channel is the channel where network nodes send requests for connection setup. This channel exists before actual point-to-point data channel is setup. Thus, in this field of the pilot signal, the node broadcasts the information regarding the access channel on which another node that is interested in establishing a link with the broadcasting node can communicate and exchange necessary messages with the broadcasting node in order to setup the required link. For instance, if the access channel is implemented using the CDMA technique (as in IS-95), the PN-code to which the access-channel receiver listens can be broadcast in this field. Notice that messages required for termination of an existing link may be embedded in the traffic being sent over the actual link, if the link is still good to use and its termination has been based on the desire to replace it with a better link. In case the link is too bad to use or one of the nodes can not hear the other over the link, the access channel can then be used to exchange messages for link termination.

(viii) Error Detection Coding: The error detection coding field is used to validate the received pilot signal and detect possible decoding errors. One example of such error detection that may be employed is a CRC (cyclic redundancy check). However, it is to be appreciated that, in addition to or instead of CRC, the whole pilot signal may be coded for error correction purposes.

(d) Pilot Quality Indicator

Figure 7:
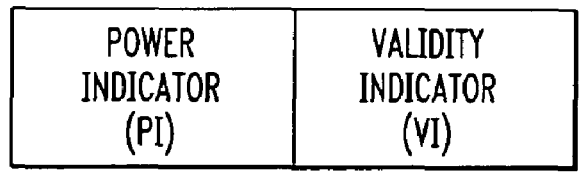
FIG. 7 is a diagram illustrating a format of a pilot quality indicator (PQI) according to an embodiment of the present invention.

The pilot quality indicator or PQI is a set of grades, according to some reasonable metrics, which are used by a node to rank other nodes in its vicinity according to pilot measurements. In one embodiment, the PQI comprises two fields as shown in FIG. 7. The first field is a "Power Indicator" or PI, and the second field is a "Validity Indicator" or VI. Both indicators may be "soft" or "hard." The term "soft" as used in this context means that the indicator can take on more than two values, e.g., 1 to 10, while the term "hard" as used in this context means that the indicator can take only two values, e.g., pass or fail. In one embodiment, we provide for a soft PI and a hard VI. A soft PI is a number between, for example, "0" and "β" which ranks the power level received over the (pilot, slot) pair corresponding to the pilot of concern. A "0" means that the received pilot power is below threshold and is not acceptable. A "1" means that the received pilot power is barely acceptable (right above threshold), while a "β" means that the pilot power is the strongest. The PI can generally be based on the average of the received pilot power over the past time period of length, for example, T.

The validity indicator VI is obtained by running the error detection coding/decoding check on the received pilot signal. In addition, one may design (i.e., code) node ID's such that they are separated by some coding distance, which enables the decoder to know if an ID is valid. The VI takes on two values. A "0" means that the received pilot signal is not consistently decipherable. That is, the error detection coding/decoding check received on that pilot has failed fairly frequently. On the other hand, a "1" means that the received pilot signal is valid and consistently readable. Of course, an acceptable PQI for our exemplary embodiment is one that has a PI greater than 0 and a VI equal to 1. In some cases, a system designer may also define a good quality PQI for which VI equals 1 and PI is greater than or equal to a, where a is some positive integer greater than 0. This way, the nodes can distinguish between nodes which are "heard" and nodes which are "heard with good quality." By the term "heard," we mean that a pilot signal has been detected and decoded, which, in our example, corresponds to a PI greater than 0 and a VI equal to 1. As will be explained later, the PQI plays a major role in assisting the pilot management algorithm in making decisions regarding changing the (pilot, slot) pair which a node is using. It also helps in ranking nodes according to the quality of their received pilots and in influencing the decisions of the link setup algorithm.

IV. Pilot Detection And Processing (a) Starting Up Nodes

When a node is starting up, i.e., just turned on (powered up), it senses pilots available for its own transmission and picks the best among them, as described in the previous section, and sends a pilot signal. From the next frame on, following that during which the node has finally decided on a (pilot, slot) pair to use (let us, for example, call it the "second frame"), the starting node (i.e., a node which is starting up) begins to listen to all slots and all pilots, other than the (pilot, slot) pair it has chosen for its pilot transmission, looking for a response to the pilot signal it has sent in the last frame. It is to be appreciated that the starting up node does not generally expect an immediate response. Rather, it allows for a certain number of frames until it receives a response, or more. It is to be understood that, during these frames, the node continues sending its (pilot, slot) pair, for example, in accordance with the process to be discussed below in the context of FIG. 8. Notice that a node is generally allowed to spend more than one frame until it consistently decides on a (pilot, slot) pair to use. We will just refer to all of those frames as the "first frame."

There are two procedures to perform from the second frame period onward. The first procedure comprises the starting node listening to pilot signals from other neighboring nodes in order to find out which nodes could hear it (i.e., the starting node) well. These nodes, according to some decision and ranking mechanism to be discussed later, will be characterized as candidate nodes for future links. The starting node then attempts to communicate with the candidate nodes, according to some priority mechanism, in order to negotiate link setup possibilities. The second procedure involves the situation where some neighboring nodes may have heard the pilot signal sent by the starting node in the last (i.e., the first) frame and these nodes determine that they would like to negotiate link setup with the starting node. In this case, the interested nodes will attempt, in a way to be discussed later, to access the starting node through its announced access channel and request link setup. Hence, from the second frame onward, the starting node should also listen to its access channel for link setup requests.

To summarize, there are two types of response. The first is through the "List of Nodes Heard with Good Quality" field (FIG. 6) of neighboring nodes, which determines which nodes have heard the starting node. The second response is through the starting node's access channel, which determines if some neighboring nodes are requesting link setup with the starting node. If the starting node gets no response at all, the node, obviously, does not establish any links during the current frame. However, the starting node keeps on sending its pilot signal on the (pilot, slot) pair it has chosen for the next M frames. If the node still does not receive any response, it assumes that the (pilot, slot) pair it has been using for the last M frames is not good. The node then chooses a different (pilot, slot) pair from the one it has been using and repeats the trial for another M frames.

Figure 8:
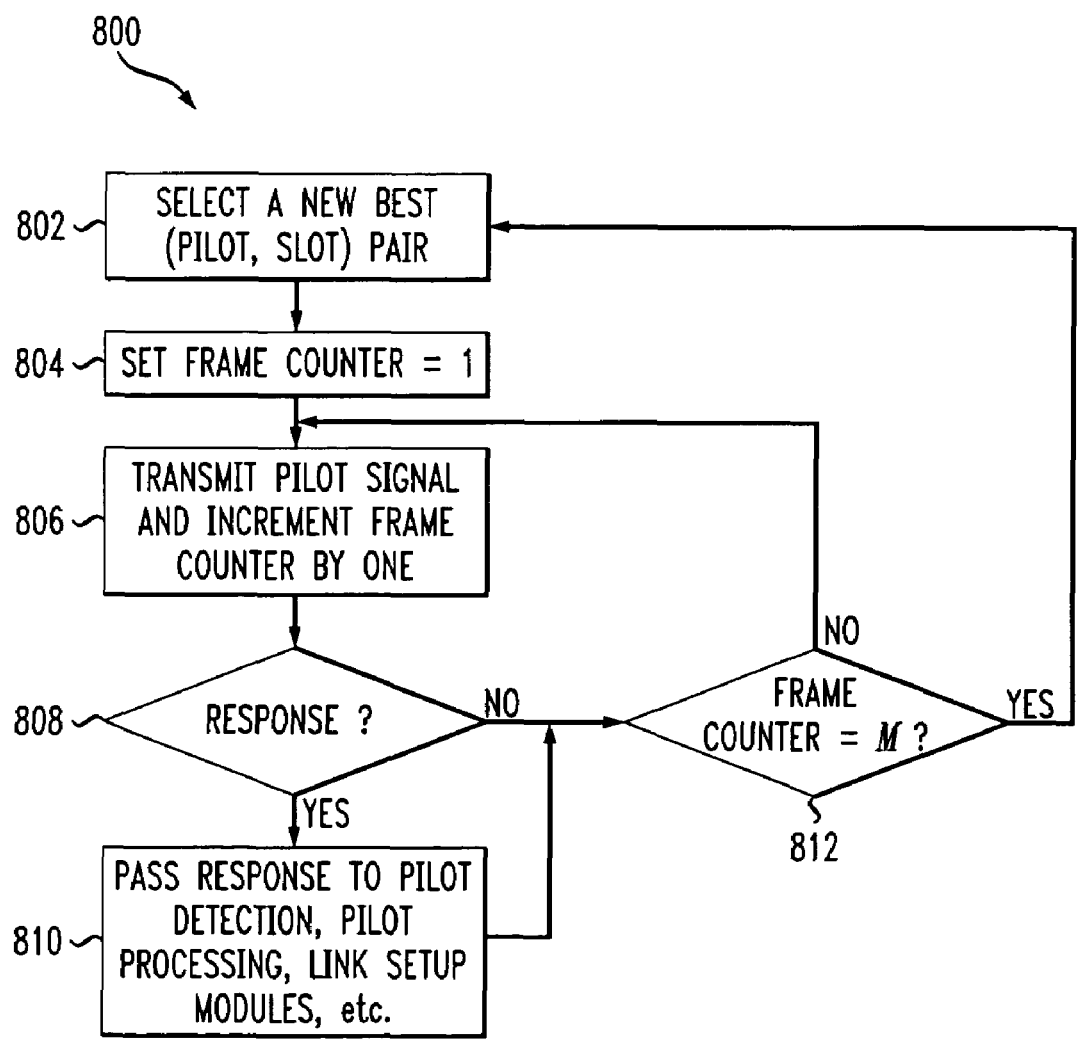
FIG. 8 is a flow diagram illustrating a starting node procedure according to an embodiment of the present invention.

FIG. 8 illustrates a flow chart of such a starting node procedure 800. As shown, in step 802, the starting node selects a best (pilot, slot) pair. In step 804, a frame counter associated with the starting nose is set to one. The starting node then transmits a pilot signal and increments the frame counter by one, in step 806. In step 808, the node determines whether or not a response has been received. If a response has been received, the response is passed onto the other processing modules of the node in step 810, e.g., pilot detection, pilot processing, link setup, etc. If no response has been received, the frame counter is checked to see if frame counter equals M, in step 812. If the frame counter does not equal M, the node returns to step 806 and continues. If the frame counter equals M, the node returns to step 802 and continues.

(b) Nodes with Existing Links (1) Node & Link Information (N&LI) Table

Figure 9:
FIG. 9 is an example of a node and link information table according to an embodiment of the present invention.

A node that is already communicating with other nodes via some established links listens every frame to all slots and all pilots, other than the (pilot, slot) pair it is currently using for its pilot transmission. Using the information that a listening node has gathered by reading the pilot signals of other nodes, the listening node forms a "Node & Link Information" (N&LI) table. An example of such a table 900 is shown in FIG. 9. Notice that we denote the listening node as $n_0$, while other nodes are denoted as $n_1, n_2, \ldots, n_i$. The column headings of the N&LI table and what information is associated therewith will now be explained.

(i) Node ID: Node identification.

(ii) $PLC_{0,i}$: PLC refers to a Pilot Loss Counter, implementations of which will be explained below. The $PLC_{0,i}$ is a non-negative integer number that indicates the number of recent frames (the definition of which depends on the PLC type to be explained below) during which the node $n_0$ did not hear node $n_i$ with good quality, and while node $n_i$ was still listed in node $n_0$'s N&LI table. In other words, the counter indicates the number of frames since the last time the node did hear node $n_i$ with good quality. Please note that the subscript notation (0, i) corresponds to node $n_0$ hearing (or not hearing) node $n_i$, i.e., we are considering communication from node $n_i$ to node $n_0$.

(iii) Do I have link with node $n_i$?: This indicates whether node $n_0$ has an existing link with node $n_i$.

(iv) Location of Node $n_i$: Location of neighboring node, i.e., $n_i$, as announced in $n_i$'s pilot signal during the current frame (see definition above with respect to FIG. 6).

(v) Access Channel of node $n_i$: Access channel of corresponding node, i.e., $n_i$, as announced in $n_i$'s pilot signal during the current frame (see definition above with respect to FIG. 6).

(vi) $PQI_{0,i}$: This refers to the $(n_0, n_i)$ Pilot Quality Indicator (see definition above with respect to FIG. 7) as the listening node, i.e., $n_0$, finds it during the current frame or, possibly, some average measure of $PQI_{0,i}$ collected over recent frames. Notice that $n_0$ will announce $PQI_{0,i}$ in the next frame, if it qualifies for announcement.

(vii) Number of Possible Additional Links for $n_i$: This refers to the number of possible additional links the corresponding node $n_i$ can set up. This is announced in its pilot signal during the current frame (see definition above with respect to FIG. 6).

(viii) Existing Links for $n_i$: This refers to the list of ID's, (pilot, slot) pairs and locations of the nodes, which $n_i$ has links with, as announced in $n_i$'s pilot signal during the current frame (see definition above with respect to FIG. 6).

(ix) Nodes Heard with Good Quality by $n_i$: list of ID's, (pilot, slot) pairs and locations of the nodes, which $n_i$ hears with good quality, as announced in $n_i$'s pilot signal during the current frame (see definition above with respect to FIG. 6).

(x) (pilot, slot) pair for $n_i$: This refers to the (pilot, slot) pair $n_i$ is using for transmission of its pilot signal during the current frame.

(xi) Does $n_i$ hear me?: This is an indication as to whether $n_1$ actually hears the corresponding nodes at all? If YES: The table makes provision for indicating "what is the $PQI_{i,0}$ as $n_i$ finds for $n_0$?" If NO: The table makes provision for indicating "what are the values of the Pilot Loss ($PLC_{i,0}$) and the Pilot Switch ($PSC_{i,0}$) Counters?" The use of the PLC and the PSC will be discussed later. The $PLC_{i,0}$ is a non-negative integer number that indicates the number of recent frames during which the node $n_i$ was not hearing node $n_0$, i.e., node $n_i$ was not listing node $n_0$ among its list of "List of Nodes Heard with Good Quality" (while node $n_i$ was still listed in node $n_0$'s "Node & Link Information" table). The $PSC_{i,0}$ is a non-negative integer number that indicates the number of (pilot, slot) pair switches by node $n_0$ which happened recently while node $n_i$ was not hearing node $n_0$. That is, $PSC_{i,0}$ is the number of times (while node $n_i$ was still listed in node $n_0$'s "Node & Link Information" table and not hearing node $n_0$) node $n_0$ has switched to a new (pilot, slot) pair. Notice that the PLC and PSC are not transmitted in the pilot signal. These are only local information to the node that are inferred from reading pilot signals of other nodes, as described above.

(2) Implementations of the Pilot Loss (PLC) Counter:

The PLC counter can be implemented in a number of ways. Two examples of implementations are now given:

Type I Counter: A simple counter can be implemented such that every time the corresponding condition (i.e., a pilot loss event) occurs, the counter is incremented by one. On the other hand, every time the corresponding condition (i.e., a pilot loss event) does not occur, the counter is decremented by one. The minimum value for the counter is, clearly, zero, i.e., negative values are not allowed. The counter is also constrained in terms of the maximum value it can reach.

Type II Counter: A more intelligent counter can be implemented such that it counts the number of times the corresponding condition has occurred in the last, say, g frames. Such a counter captures the corresponding statistics in more detail than the Type I counter. However, this implementation is obviously a more complex counter to implement since it requires a buffer (or a shift register) of size g for every node listed in the N&LI table. This buffer is called the Pilot Loss Buffer, or simply PLB. Notice that a "0" in the buffer corresponds to a "no pilot loss" for the corresponding frame, and vice versa. Also, notice that setting the PLC to zero means that PLC=0, and the corresponding buffer, i.e., PLB, is also reset to the all zero state.

(3) Implementations of the Pilot Switch (PSC) Counter:
Similar to the PLC counter, the PSC counter can be implemented in a number of ways, two of which are now described:

Type I Counter: A simple counter can be implemented such that every time the corresponding condition (i.e., a pilot switch event) occurs, the counter is incremented by one. On the other hand, every time the corresponding condition (i.e., a pilot switch event) does not occur, the counter is kept as is if the listening node $n_0$ can not hear the neighboring node $n_1$ for the current frame, and decremented by one if $n_0$ can hear $n_i$ for the current frame and the corresponding PLC (i.e., $PLC_{i,0}$) is less than some value. The minimum value for the counter is, clearly, zero, i.e., negative values are not allowed. The counter is also constrained in terms of the maximum value it can reach.

Type II Counter: Again, similar to PLC, a more intelligent PSC counter can be implemented such that it counts the number of times the corresponding condition has occurred in the last, say, f frames. Such a counter will require a buffer (or a shift register) of size f for every node listed in the N&LI table. This buffers is called the Pilot Switch Buffer, or simply PSB. Notice that a "0" in the buffer corresponds to a "no pilot switch" for the corresponding frame, and vice versa. Also, notice that setting the PSC to zero means that PSC=0, and the corresponding buffer, i.e., PSB, is also reset to the all zero state.

(c) Pilot Processing for Nodes with Existing Links

Every frame, a node listens to all (pilot, slot) pairs other than the one it is using. The node then uses the information broadcast in the pilot signals of heard nodes to update the Node & Link Information (N&LI) table. Once the updating process is complete, the listening node starts to process the table and make corresponding decisions. A high level view of the pilot sensing and management procedure is depicted in FIG. 10.

Figure 10:
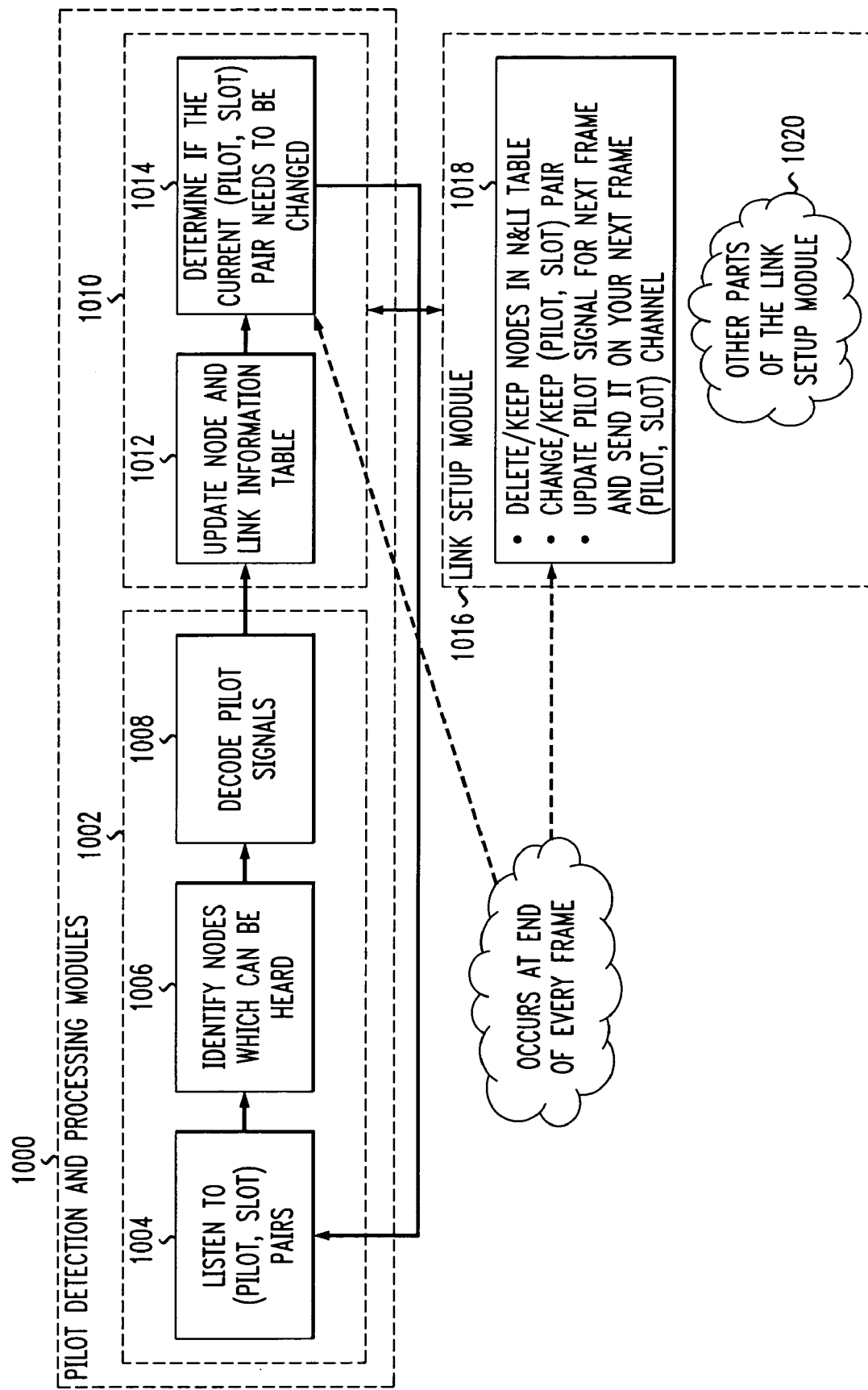
FIG. 10 is a flow diagram illustrating a pilot sensing and management procedure according to an embodiment of the present invention.

As shown in FIG. 10, block 1000 corresponds to the pilot transmission/detection module 206 and the pilot processing module 208 shown in FIG. 2. Particularly, block 1002 corresponds to the pilot transmission/detection module 206 and block 1010 corresponds to the pilot processing module 208. Block 1016 corresponds to the link setup module 212 shown in FIG. 2. Blocks in each module, 1000 and 1016, correspond to a pilot sensing and management procedure according to an embodiment of the invention. In particular, the steps also include steps executed by a node for generating a N&LI table (FIG. 9).

Thus, in accordance with module 1002, the node listens or scans (pilot, slot) pairs, in step 1004. Then, in step 1006, the node identifies readable pairs that correspond to "hearable" nodes. In step 1008, the pilot signals of hearable nodes are decoded. Then, in accordance with module 1010, the node's N&LI table is updated, in step 1012, according to the information decoded from the pilot signals. Then, in step 1014, the node determines whether its current (pilot, slot) pair needs to be changed. This decision is based on the updated N&LI table.

Then, in accordance with module 1016, the node deletes/keeps nodes in the N&LI table, changes/keeps (pilot, slot) pair, and updates the pilot signal for the next frame. The updated pilot signal is then sent on the next frame (pilot, slot) channel. These operations are performed in step 1018. It is to be appreciated that steps 1014 and 1018 occur at the end of every frame. Block 1020 corresponds to other parts of the link setup module that do not relate to topology sensing.

In general, the listening node should pass the Node and Link Information table to the network construction layer in order to assist the link setup algorithm in making proper decisions. However, prior to passing the N&LI table to network-construction layer, the following checks are made (in their respective chronological sequence), for which the listening node should take respective decisions as listed below. Thus, the following steps comprise an algorithm executed by a node for generating a N&LI table.

1. For a node, $n_i$, that has no existing link(s) with the listening node, $n_0$, and has been newly heard by the listening node (that is, $n_0$, has only, recently, been able to hear the other node's (i.e., $n_i$) pilot signal with $PQI_{0,i}$ such that $PI_{0,i} > 0$ and $VI_{0,i} = 1$, and $n_i$ has not been listed in the last version of the N&LI table (during the last frame), then one of the following actions should take place:

(i) If the newly heard node, $n_i$, has been able to hear $n_0$, i.e., $n_1$ has listed $n_0$ in its "List of Nodes Heard with Good Quality," then $n_0$ confirms the addition of $n_1$ to its N&LI table and sets the $PLC_{0,i}$, $PLC_{i,0}$ and $PSC_{i,0}$ corresponding to $n_i$ to zero.

(ii) If the newly heard node, $n_i$, has not been able to hear $n_0$, i.e., $n_i$ has not listed $n_0$ in its "List of Nodes Heard with Good Quality," then $n_0$ does not include $n_i$ in its N&LI table subject to the approval of the link setup algorithm. If the link setup algorithm disapproves the deletion, the new node information is added to the N&LI table for one more frame, and the $PLC_{0,i}$ and $PSC_{i,0}$ are set to zero, while $PLC_{i,0}$ is incremented, i.e., updated, appropriately according to its implementation type, i.e., Type I or Type II, as normal.

2. A node, $n_i$, that has already existed in the N&LI table of $n_0$ from the last frame (or before) and $n_0$ is still not able to hear $n_i$ during the current frame and $n_i$ has the corresponding $PLC_{0,i}$ (in the N&LI table of $n_0$) equal to, or greater than, the maximum acceptable value $\eta$, should be deleted off the N&LI table subject to the approval of the link setup algorithm. If the link setup algorithm disapproves the deletion, the node information is kept for one more frame and only $PLC_{0,i}$ is updated appropriately as normal, according to its type.

3. A node, $n_i$, that has already existed in the N&LI table of $n_0$ from the last frame (or before) and $n_0$ is still able to hear $n_i$ during the current frame; and $n_i$ has the corresponding $PLC_{i,0}$ (in the N&LI table of $n_0$) equal to, or greater than, the maximum acceptable value $\gamma$, and is still unable to hear $n_0$ during the current frame. Then, $n_1$ should be deleted off the N&LI table of $n_0$ subject to the approval of the link setup algorithm. If the link setup algorithm disapproves the deletion, the node information is kept for one more frame and only $PLC_{i,0}$ is updated appropriately as normal, according to its type.

4. A node, $n_i$, that has already existed in the N&LI table of $n_0$ from the last frame (or before) and $n_0$ is still able to hear $n_i$ during the current frame and $n_i$ has the corresponding $PSC_{i,0}$ (in the N&LI table of $n_0$) equal, or greater than, to the maximum acceptable value $\lambda$, and is still unable to hear $n_0$ during the current frame. Then, $n_i$ should be deleted off the N&LI table of $n_0$ subject to the approval of the link setup algorithm. If the link setup algorithm disapproves the deletion, the node information is kept for one more frame and $PSC_{i,0}$ is updated appropriately as normal, according to its type.

5. A node, $n_i$, that has already existed in the N&LI table of $n_0$ from the last frame (or before) and for that node $PLC_{0,i}<\eta$, $PLC_{i,0}<\gamma$ and $PSC_{i,0}<\lambda$, for the current frame. In this case, all the three counters should be updated appropriately according to their types and according to the status of $n_i$ with respect to $n_0$, i.e., whether $n_i$ can hear $n_0$ during the current frame, and whether $n_0$ can hear $n_i$ during the current frame. Notice that if $n_0$ can not hear $n_i$ during the current frame, all information regarding $n_i$ (in the N&LI table) other than $PLC_{0,i}$ should be frozen until $n_0$ is able to hear $n_i$ again.

6. After the checks described in steps 1 through 5 above have been made and reacted upon, a pilot switch process is initiated according to the following rule: If all of the conditions constituting a row in the following table are simultaneously satisfied, start a pilot switch process. A pilot switch process is basically the node changing to a new (pilot, slot) pair other than the one it is already using.

FIG. 11 illustrates a condition table for initiating the pilot switch process. A "linked node" is a node which has a link with $n_0$. A non-linked node is a node which does not have a link with $n_0$. According to the condition table shown in FIG. 11, a pilot switch process is triggered if one of the following conditions is satisfied, where $l_1$, through $l_8$ and $c_L$ and $c_{NL}$ are design parameters chosen according to required performance. The parameter l refers to the minimum number of corresponding node types (i.e., linked or non-linked), while c corresponds to a minimum required value for the corresponding $PLC_{0,i}$, where $c_L$ corresponds to a linked node and $c_{NL}$ corresponds to a non-linked node. The trigger conditions are:

(i) at least $l_1$ linked nodes cannot hear $n_0$ for the current frame;

(ii) at least $l_2$ non-linked nodes cannot hear $n_0$ for the current frame;

(iii) a combination of at least $l_3$ linked nodes that cannot hear $n_0$, and at least $l_4$ non-linked nodes that cannot hear $n_0$ for the current frame;

(iv) at least $l_5$ linked nodes cannot hear $n_0$ for the last $c_L$ frames;

(v) at least $l_6$ non-linked nodes cannot hear $n_0$ for the last $c_{NL}$ frames;

(vi) a combination of at least $l_7$ linked nodes that cannot hear $n_0$ for the last $c_L$ frames, and at least $l_8$ non-linked nodes, that cannot hear $n_0$ for the last $c_{NL}$ frames.

Since linked nodes may, in general, be given higher importance than non-linked nodes, it is possible to design the parameters $l_1$ through $l_8$ and $c_L$ and $c_{NL}$ such that they follow the following design rules:

$l_1 \leq l_2$, $l_1 \geq l_3$, $l_2 \geq l_4$, $l_1 \geq l_5$, $l_2 \geq l_6$, $l_1 \geq l_7$, $l_2 \geq l_8$, $l_3 \geq l_7$, $l_4 \geq l_8$, $l_5 \leq l_6$, $l_5 \geq l_7$, $l_6 \geq l_8$. Also, $c_L \leq c_{NL}$.

For example, with $l_1<l_2$, the node would switch pilots if 3 linked nodes cannot hear it or if 5 non-linked nodes cannot hear it. By way of another example, if $l_7=2$, $l_8=3$, $C_L=3$ and $c_{NL}=4$, this means that a pilot switch process should be initiated if at least two linked nodes have not heard $n_0$, recently, for at least three times (i.e., $PLC_{i,0}^L \geq 3$), and at least three non-linked nodes have not heard $n_0$, recently, for at least four times (i.e., $PLC_{j,0}^{NL} \geq 4$).

7. Regardless of the pilot switch conditions required for pilot switch initiation, as described above, a pilot switch is initiated every T frames, where T can either be a fixed positive integer, or T can be a random positive integer; bounded such that $T_L \leq T \leq T_U$.

8. The search procedure for a "pilot switch" is initially performed over all (pilot, slot) pairs which do not exist in the N&LI table. If, by chance, no pairs are available to search into, then the (pilot, slot) search is performed over all pairs which are not used by the first tier nodes, i.e., nodes which have their ID's listed in the first column of the N&LI table. A pilot selection is based on the method described above in Section IV(a).

9. Any initiation of a pilot switch should cause the $PSC_{i,0}$'s of all nodes, $n_i$, in the N&LI table to be updated appropriately, according to their types.

When all the checks above are complete, the pilot management module passes the N&LI table to the link setup module (of the network construction layer). The link setup module determines the links to be deleted, links to be kept and links to be established and updates the N&LI table accordingly. The link setup module passes the updated N&LI table back to the pilot management module. The pilot management module then extracts from the updated N&LI table all the necessary information to be included in the pilot signal of node $n_0$ during the next frame. The pilot management module then passes such information to the pilot transmission module for transmission during the next frame.

It should be understood that a pilot switch process can also be initiated if the link setup module orders so. This will happen, for example, if the link setup module finds that for some link(s), the $PQI_{i,0}$'s of the corresponding linked node(s) are not acceptable while the actual link(s) existing with such node(s) are in a good shape. The link setup module may, in this case, order a pilot switch process in order to pick a different (pilot, slot) pair such that the affected linked nodes can hear the pilot of $n_0$ again.

Note that the algorithm for N&LI table construction and maintenance described above is one of many possible ways of constructing and maintaining such table. Many other variants of this algorithm are also possible. In addition, if the amount of information broadcast in the pilot signals is reduced, it will lead to fewer fields in the N&LI table which could also lead to reduced complexity in the table construction algorithm.

V. Link Setup

In order for the link setup mechanism to function best, the information obtained through pilot sensing must be taken into account. Although the design of a link setup mechanism is beyond the scope of the invention, we provide some guidelines, or considerations, that should be taken into account when designing a link setup algorithm.

(a) Link Establishment

1. Nodes with "far" location (e.g., "far" may be associated with geographic distance or routing, i.e., many hops) should be given lower priority even if they have acceptable PQI. This is because far nodes are more likely to disappear quickly and hence, links established with such nodes may be torn down rapidly.

2. If the PI field, of some node's PQI, is acceptable but the VI is not, then this is probably because there is more than one node, within the hearing distance of the listening node, which is using the same (pilot, slot) pair and coexisting in the same vicinity. Hence, this does not necessarily mean that an existing link channel with such node is in jeopardy as pilots and link channels are separate. On the other hand, if the PQI is acceptable but link quality is not, then it may make sense to switch to a different link channel. Finally, if both the PQI and the link quality are unacceptable, then it can be assumed that it is the communication process that is deteriorating because of nodes getting far from each other or because of deep fading, etc. That is, it is not because of a collision problem.

3. Links should be established based on all the information available from the N&LI table.

4. Routing complexity should also be taken into account when establishing new links. A local map of connections is available from the N&LI table.

(b) Link Termination

1. Links should not be terminated quickly because of pilot loss or degradation of link quality. A wait period should be exercised prior to making a termination decision.

2. A decision to drop a link and replace it with another should be based on the information from the N&LI table in order to rank nodes appropriately.

Accordingly, a novel topology sensing methodology has been described for point-to-point link setup among a set of network nodes, which are mobile. The technique provided is TDMA contention-based, where each network node sends pilot signals to announce its existence. Pilot signals transmitted by network nodes are used by surrounding nodes to extract various pieces of information such as node identity, node location and potential link quality. Information collected from pilot signals of neighboring nodes is used in conjunction with other topological criteria to identify the best set of nodes with which a given node should establish links. The topology sensing methodology avoids duplexer problems and attempts to achieve minimum collision by allowing the nodes to continually monitor available pilots and transmit on the least-interference channels. The topology sensing methodology can also optionally make use of GPS information, when available, in order to provide an accurate map for communicating nodes and improve the link setup process.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for use in accordance with a given network node of a wireless communications network for tracking a topology of the network, wherein the network includes one or more other network nodes and wherein one or more of the network nodes in the network are capable of being mobile and one or more of the network nodes provide network access to one or more mobile user stations in the network, the method comprising the steps of:

generating a pilot signal, the pilot signal including topology sensing related information for use by one or more of the other network nodes in the network for tracking the network topology;

transmitting the pilot signal on a selected pilot channel, the selected pilot channel being independent of a user traffic channel associated with the network node; and dynamically switching the selected pilot channel to another pilot channel;

wherein the pilot channel to be switched to is selected on one of a channel quality and an availability basis.

2. The method of claim 1, wherein the topology sensing related information comprises a list of network nodes which the given network node can satisfactorily hear.

3. The method of claim 1, wherein the topology sensing related information comprises an identifier of the given network node.

4. The method of claim 1, wherein the pilot signal comprises a preamble portion including information for use in at least one of synchronization and estimating a channel status.

5. The method of claim 1, wherein the pilot signal includes link related information.

6. The method of claim 1, wherein the pilot channel is dynamically switched on one of a random and non-random basis.

7. The method of claim 1, wherein the pilot channel is dynamically switched when one or more pilot channel switch conditions are met.

8. The method of claim 1, further comprising the step of receiving at least one pilot signal on a pilot channel, the at least one received pilot signal being generated and transmitted by one of the other network nodes in the network.

9. The method of claim 8, further comprising the step of processing the at least one received pilot signal and storing at least a portion of information generated during the processing step in a data storage structure.

10. The method of claim 9, wherein the data storage structure stores one or more identifiers of one or more other network nodes in the network.

11. The method of claim 9, wherein the data storage structure stores data specifying one or more locations of one or more other network nodes in the network.

12. The method of claim 9, wherein the data storage structure stores data specifying whether or not the given node has one or more links with one or more other network nodes in the network.

13. The method of claim 9, wherein the data storage structure stores one or more identifiers of access channels of one or more other network nodes in the network.

14. The method of claim 9, wherein the data storage structure stores one or more indicators of a pilot channel quality associated with one or more other network nodes in the network.

15. The method of claim 14, wherein the pilot channel quality indicator comprises a power indicator, the power indicator providing a measure of the power level associated with a pilot signal received from a network node.

16. The method of claim 9, wherein the data storage structure stores data specifying a number of possible additional links that one or more other network nodes in the network can setup.

17. The method of claim 9, wherein the data storage structure stores data specifying information relating to links that one or more other network nodes in the network currently have setup.

18. The method of claim 9, wherein the data storage structure stores data specifying information relating to nodes satisfactorily heard by one or more other network nodes in the network.

19. The method of claim 9, wherein the data storage structure stores data specifying information relating to whether nodes hear the given network node.

20. The method of claim 1, wherein the pilot channel is specified according to a time slot and a frequency value.

21. The method of claim 1, wherein the pilot channel is specified according to a time slot and a code sequence.

22. A method for use in accordance with a given network node of a wireless communications network for tracking a topology of the network, wherein the network includes one or more other network nodes and wherein one or more of the network nodes in the network are capable of being mobile and one or more of the network nodes provide network access to one or more mobile user stations in the network, the method comprising the steps of:

generating a pilot signal, the pilot signal including topology sensing related information for use by one or more of the other network nodes in the network for tracking the network topology;

transmitting the pilot signal on a selected pilot channel, the selected pilot channel being independent of a user traffic channel associated with the network node; and dynamically switching the selected pilot channel to another pilot channel;

wherein the pilot channel is dynamically switched when one or more pilot channel switch conditions are met;

further wherein a switch condition is that at least a predetermined number of network nodes linked to the given network node can not bear the given node for a current frame.

23. A method for use in accordance with a given network node of a wireless communications network for tracking a topology of the network, wherein the network includes one or more other network nodes and wherein one or more of the network nodes in the network are capable of being mobile and one or more of the network nodes provide network access to one or more mobile user stations in the network, the method comprising the steps of:

generating a pilot signal, the pilot signal including topology sensing related information for use by one or more of the other network nodes in the network for tracking the network topology;

transmitting the pilot signal on a selected pilot channel, the selected pilot channel being independent of a user traffic channel associated with the network node; and dynamically switching the selected pilot channel to another pilot channel;

wherein the pilot channel is dynamically switched when one or more pilot channel switch conditions are met;

further wherein a switch condition is that at least a predetermined number of network nodes not linked to the given network node can not hear the given node for a current frame.

24. A method for use in accordance with a given network node of a wireless communications network for tracking a topology of the network, wherein the network includes one or more other network nodes and wherein one or more of the network nodes in the network are capable of being mobile and one or more of the network nodes provide network access to one or more mobile user stations in the network, the method comprising the steps of:

generating a pilot signal, the pilot signal including topology sensing related information for use by one or more of the other network nodes in the network for tracking the network topology;

transmitting the pilot signal on a selected pilot channel, the selected pilot channel being independent of a user traffic channel associated with the network node; and dynamically switching the selected pilot channel to another pilot channel;

wherein the pilot channel is dynamically switched when one or more pilot channel switch conditions are met;

further wherein a switch condition is that a combination of at least a first predetermined number of network nodes linked to the given network node and at least a second predetermined number of network nodes not linked to the given network node can not hear the given node for a current frame.

25. A method for use in accordance with a given network node of a wireless communications network for tracking a topology of the network, wherein the network includes one or more other network nodes and wherein one or more of the network nodes in the network are capable of being mobile and one or more of the network nodes provide network access to one or more mobile user stations in the network, the method comprising the steps of:

generating a pilot signal, the pilot signal including topology sensing related information for use by one or more of the other network nodes in the network for tracking the network topology;

transmitting the pilot signal on a selected pilot channel, the selected pilot channel being independent of a user traffic channel associated with the network node; and dynamically switching the selected pilot channel to another pilot channel;

wherein the pilot channel is dynamically switched when one or more pilot channel switch conditions are met;

further wherein a switch condition is that at least a predetermined number of network nodes linked to the given network node can not hear the given node for a number of previous frames.

26. A method for use in accordance with a given network node of a wireless communications network for tacking a topology of the network, wherein the network includes one or more other network nodes and wherein one or more of the network nodes in the network are capable of being mobile and one or more of the network nodes provide network access to one or more mobile user stations in the network, the method comprising the steps of:

generating a pilot signal, the pilot signal including topology sensing related information for use by one or more of the other network nodes in the network for tracking the network topology;

transmitting the pilot signal on a selected pilot channel, the selected pilot channel being independent of a user traffic channel associated with the network node; and dynamically switching the selected pilot channel to another pilot channel;

wherein the pilot channel is dynamically switched when one or more pilot channel switch conditions are met;

father wherein a switch condition is that at least a predetermined number of network nodes not linked to the given network node can not hear the given node for a number of previous frames.

27. A method for use in accordance with a given network node of a wireless communications network for tracking a topology of the network, wherein the network includes one or more other network nodes and wherein one or more of the network nodes in the network are capable of being mobile and one or more of the network nodes provide network access to one or more mobile user stations in the network, the method comprising the steps of:

generating a pilot signal, the pilot signal including topology sensing related information for use by one or more of the other network nodes in the network for tracking the network topology, transmitting the pilot signal on a selected pilot channel, the selected pilot channel being independent of a user traffic channel associated with the network node; and dynamically switching the selected pilot channel to another pilot channel;

wherein the pilot channel is dynamically switched when one or more pilot channel switch conditions are met;

further wherein a switch condition is that a combination of at least a first predetermined number of network nodes linked to the given network node can not hear the given node for a first number of previous frames and at least a second predetermined number of network nodes not linked to the given network node can not hear the given node for a second number of previous frames.

28. A method for use in accordance with a given network node of a wireless communications network for tracking a topology of the network, wherein the network includes one or more other network nodes and wherein one or more of the network nodes in the network are capable of being mobile and one or more of the network nodes provide network access to one or more mobile user stations in the network, the method comprising the steps of:

generating a pilot signal, the pilot signal including topology sensing related information for use by one or more of the other network nodes in the network for tracking the network topology;

transmitting the pilot signal on a selected pilot channel, the selected pilot channel being independent of a user traffic channel associated with the network node;

receiving at least one pilot signal on a pilot channel, the at least one received pilot signal being generated and transmitted by one of the other network nodes in the network; and processing the at least one received pilot signal and storing at least a portion of information generated during the processing step in a data storage structure;

wherein the data storage structure stores one or more values indicating a number of frames during which the given network node satisfactorily heard one or more other network nodes in the network.

29. A method for use in accordance with a given network node of a wireless communications network for tracking a topology of the network, wherein the network includes one or more other network nodes and wherein one or muore of the network nodes in the network are capable of being mobile and one or more of the network nodes provide network access to one or more mobile user stations in the network, the method comprising the steps of:

generating a pilot signal, the pilot signal including topology sensing related information for use by one or more of the other network nodes in the network for tracking the network topology;

transmitting the pilot signal on a selected pilot channel, the selected pilot channel being independent of a user traffic channel associated with the network node;

receiving at least one pilot signal on a pilot channel, the at least one received pilot signal being generated and transmitted by one of the other network nodes in the network; and processing the at least one received pilot signal and storing at least a portion of information generated during the processing step in a data storage structure;

wherein the data storage structure stores one or more indicators of a pilot channel quality associated with one or more other network nodes in the network;

further wherein the pilot channel quality indicator comprises a validity indicator, the validity indicator providing a measure of an error detection check associated with a pilot signal received from a network node.

30. The method of claim 29, wherein the data storage structure stores data specifying whether or not the given node has one or more links with one or more other network nodes in the network.

31. Apparatus for use in accordance with a given network node of a wireless communications network for tracking a topology of the network, wherein the network includes one or more other network nodes and wherein one or more of the network nodes in the network are capable of being mobile and one or more of the network nodes provide network access to one or more mobile user stations in the network, the apparatus comprising:

at least one processor operative to enable: (i) generation of a pilot signal, the pilot signal including topology sensing related information for use by one or more of the other network nodes in the network for tracking the network topology; and (ii) transmission of the pilot signal on a selected pilot channel, the selected pilot channel being independent of a user traffic channel associated with the network node;

wherein the at least one processor is further operative to enable dynamic switching of the selected pilot channel to another pilot channel.

32. The apparatus of claim 31, wherein the at least one processor is further operative to enable receipt of at least one pilot signal on a pilot channel, the at least one received pilot signal being generated and transmitted by one of the other network nodes in the network.

33. The apparatus of claim 32, wherein the at least one processor is further operative to enable processing of the at least one received pilot signal and storage of at least a portion of information generated during the processing step in a data storage structure.

34. The apparatus of claim 31, wherein the pilot channel is specified according to a time slot and a frequency value.

35. The apparatus of claim 31, wherein the pilot channel is specified according to a time slot and a code sequence.

* * * * *

UNITED STATES PATENT AND TRADEMARK OFFICE
CERTIFICATE OF CORRECTION

| | | |
|---|---|---|
| PATENT NO. | : 7,158,484 B1 | Page 1 of 1 |
| APPLICATION NO. | : 09/513325 | |
| DATED | : January 2, 2007 | |
| INVENTOR(S) | : W. Ahmed et al. | |

It is certified that error appears in the above-identified patent and that said Letters Patent is hereby corrected as shown below:

In the claims:

Claim 26, col. 23, line 18, please delete "father" and insert -- further--.

Claim 29, col. 24, line 11, please delete "muore" and insert -- more--.

Signed and Sealed this

Seventeenth Day of April, 2007

JON W. DUDAS
*Director of the United States Patent and Trademark Office*